June 2, 1953 B. A. HALVERSON 2,640,403
CULTIVATOR DEPTH CONTROL DEVICE
Filed April 14, 1950 2 Sheets-Sheet 1
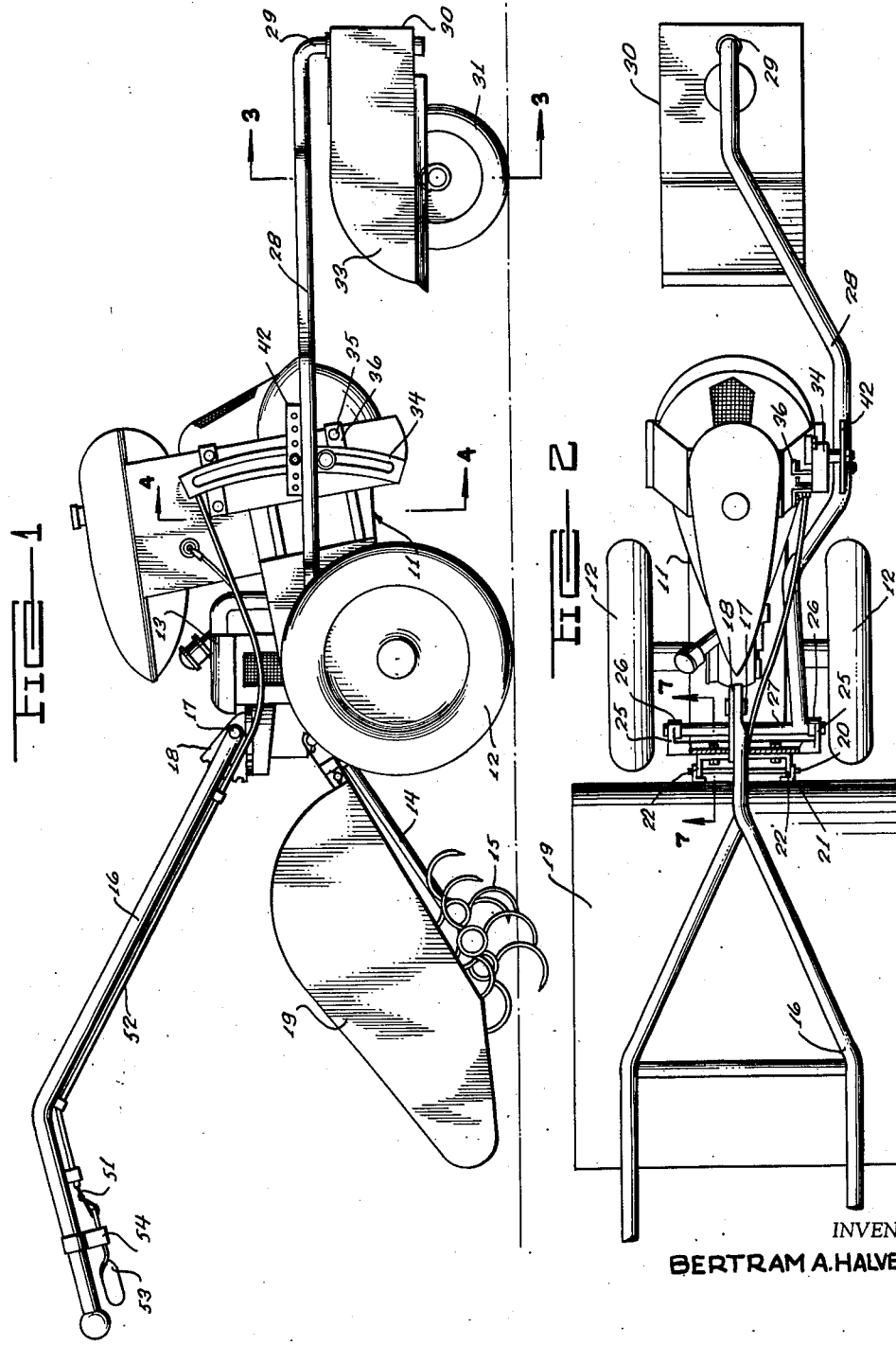
INVENTOR
BERTRAM A. HALVERSON
BY
McMorrow, Berman & Davidson
ATTORNEYS

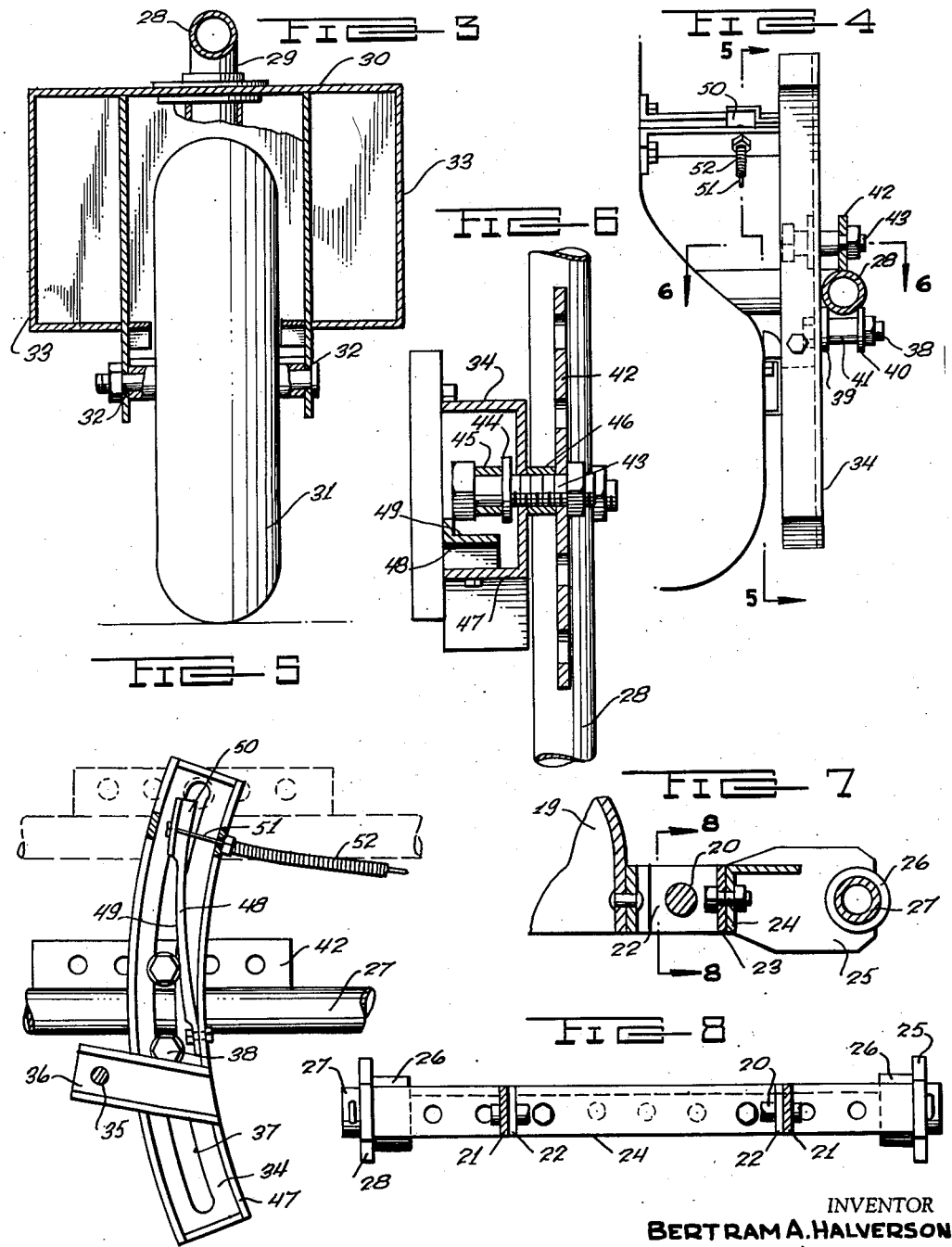

Patented June 2, 1953

2,640,403

UNITED STATES PATENT OFFICE 2,640,403

CULTIVATOR DEPTH CONTROL DEVICE

Bertram A. Halverson, Forest Grove, Oreg.

Application April 14, 1950, Serial No. 155,960

5 Claims. (Cl. 97—40)

1

This invention relates to cultivators of the rotary tiller, hand-steered, power-driven type, and more particularly to a cultivating depth controlling attachment for a hand-steered, power-driven cultivator.

A main object of the invention is to provide a novel and improved cultivator depth-controlling attachment for a hand-steered, power-driven cultivator, said attachment being very simple in construction, being easy to mount on a cultivator, and providing a very convenient and effective means for controlling the depth of cultivation of the cultivator blades of the machine.

A further object of the invention is to provide an improved garden cultivator of the hand-steered, power-driven type which provides means for at times supporting the cultivator blades thereof in a raised position out of engagement with the ground, and being further provided with means for readily returning the cultivator blades to ground engagement, the cultivator being arranged so that the point of balance around which the cultivator frame may be tilted is located forwardly of the cultivation tines, said balance point being located substantially on the axis of the rear supporting wheels of the machine, and guide means being provided for guiding the main frame of the machine for tilting movement around the axis of its rear wheels while the portion of the frame connecting the main frame of the machine to the front supporting wheels thereof remains substantially stationary.

Further objects and advantages of the invention will become apparent from the following description and claims, and from the accompanying drawings, wherein:

Figure 1 is a side elevational view of an improved garden cultivator constructed in accordance with the present invention;

Figure 2 is a top plan view of the garden cultivator illustrated in Figure 1;

Figure 3 is an enlarged transverse vertical cross-sectional view taken on line 3—3 of Figure 1;

Figure 4 is an enlarged cross-sectional detail view taken on line 4—4 of Figure 1;

Figure 5 is a cross-sectional view taken on line 5—5 of Figure 4;

Figure 6 is a cross-sectional detail view taken on line 6—6 of Figure 4;

Figure 7 is an enlarged cross-sectional detail view taken on line 7—7 of Figure 2;

Figure 8 is a cross-sectional detail view taken on line 8—8 of Figure 7.

Referring to the drawings, 11 generally designates the main frame portion of the garden cultivator, said main frame portion being provided with the ground-engaging wheels 12, 12 journaled to the main frame portion. Designated at 13 is a power unit which is mounted on the main frame portion 11, and may comprise a conventional internal combustion engine. The power unit 13 is coupled in a suitable manner, well known in the art, to the rear wheels 12, 12, and is likewise coupled by a universal joint and shaft 14 to the cultivator blades 15, the shaft 14 being arranged so that it is movable with the main frame 11, whereby the blades 15 may be elevated out of ground engagement when the main frame 11 is tilted forwardly around the axis of the wheels 12, 12.

Adjustably secured to the main frame 11 is the rearwardly and upwardly extending handle 16, the handle being pivoted to the main frame at 17 and being lockingly engageable with a sector plate 18 secured to the main frame, whereby the angle of elevation of the handle 16 relative to said main frame may be locked in any one of a plurality of adjusted positions.

Designated at 19 is a shield or housing which overlies the cultivator blades 15 and is hinged to the main frame at 20 by a transverse rod engaging in respective pairs of lugs 21, 21 and 22, 22 carried respectively by the shield 19 and the main frame 11 and defining hinge bearings. The lugs 22, 22 are formed on the ends of a bar member 23 which is bolted to a transverse angle bar 24 secured to the main frame 11, and the ends of the transverse angle bar 24 are formed with forwardly extending lugs 25, 25 carrying bearing sleeves 26, 26. Journaled in the bearing sleeves 26, 26 is a transverse shaft member 27 to one end portion of which is rigidly secured a bar member 28 which extends forwardly alongside the main frame 11 and for a considerable distance forwardly of said main frame portion 11. The bar member 28 is formed with a downwardly extending forward vertical portion 29 to which is swiveled a caster unit designated generally at 30. The caster unit 30 includes the front ground-engaging wheel 31 journaled thereto at 32, 32. As shown in Figure 3, the caster unit 30 includes longitudinally extending housing portions 33, 33 disposed on opposite sides of the plane of the caster wheel 31 and adapted to receive suitable ballast, such as stones, gravel or the like, for improving the traction of the front wheel 31 forwardly of the machine. Liquid ballast in the tire or wheel weights may also be used to improve the traction of said front wheel.

Designated at 34 is an arcuately curved, slotted bracket bar secured to the side of the main frame portion 11 adjacent the bar member 28, as by a bolt 35 extending through a lug 36 carried by the bracket bar 34 and secured in the main frame portion 11. As shown in Figure 6, the bracket bar 34 is channel shape in cross-section and faces inwardly toward the main frame portion 11. The slot of the bracket bar 34 is designated at 37, and secured in the lower portion of said slot is a bolt member 38 provided with spaced washers 39, 40 and a supporting sleeve 41 between said washers which underlies the bar member 28 and supports said bar member at a desired adjusted elevation above the lower end of the slot 37. Secured on the bar member 28 is a longitudinally extending apertured plate 42 and secured in an aperture of said plate 42 is a bolt 43. Bolt 43 extends through the slot 37, as shown in Figure 6, and is provided with a washer 44 and spacer sleeve 45 arranged to maintain the headed portion of of the bolt inside the bracket bar 34 in the manner shown in Figure 6. In addition, a spacer sleeve 46 is provided on the bolt 43 between the plate 42 and the bracket bar 34. Secured to one of the flanges 47 of the bracket bar is an upwardly extending resilient bar 48 formed with a camming surface 49 adapted to engage the head of the bolt 43 and formed at its top end with a head portion 50 adapted to lock beneath the bolt 43 when the main frame portion 11 is tilted forwardly around the axis of the wheels 12, 12 to a predetermined position. Secured to the head portion 50 is the end of a flexible cable 51 extending through a guide sleeve 52, said guide sleeve being secured to the handle 16 in the manner shown in Figure 1, and the end of the cable 51 being connected to an operating handle 53 slidably mounted in a bracket 54 carried by the rear end of the handle 16.

For normal cultivation, the position of the cultivator blades 15 may be regulated by adjusting the position of the bolt 38, whereby the bar member 28 is supported on the sleeve 41 carried by the bolt 38, and the caster unit 30, in combination with the ballast carried in the housing members 33, 33 maintains the main frame portion 11 in a fixed position. It will be understood that the weight of the power unit 13 and the weight of the cultivator blades 15 and the coupling mechanism associated therewith for connecting said cultivator blades to the power unit normally is more than counterbalanced by the weight of the bar member 28 and the caster unit 30, as well as the weight of that portion of the main frame 11 on the forward side of the axis of the wheels 12, 12. In addition, sufficient ballast is employed in the housing members 33, 33 to provide adequate traction for the front wheel 31. The depth of cultivation may be readily adjusted by adjusting the position of the bolt member 38 in the slot 37. When it is desired to elevate the cultivator blades 15 to an inoperative position, as for transporting the cultivating machine from one location to another, the main frame portion 11 is tilted forwardly around the axis of the wheels 12, 12 by exerting an upward force on the ends of the handle 16, whereby the bolt 43 cams upwardly against the spring arm 48 and snaps into a locked position above the head portion 50 of said spring arm. The ballast employed in the housing portions 33, 33 will maintain the cultivator blades 15 and the coupling mechanism associated therewith together with the main frame portion 11 in the forwardly tilted position obtained in the manner above described. When it is desired to release the cultivator blades for downward engagement with the ground, the operator merely pulls on the handle 53, thereby moving the head portion 50 of the spring arm 48 out of locking engagement with the bolt 43, allowing the frame portion 11 to rotate to its normal position, wherein the cultivator blades 15 engage the ground and provide a predetermined depth of cultivation established by the setting of the bolt 38.

While a specific embodiment of an improved garden cultivator has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a garden cultivator of the character described, a main frame, a pair of ground-engaging wheels journaled to said main frame, a power unit mounted on said main frame, a handle secured to said main frame and extending upwardly and rearwardly therefrom, a rotary implement located rearwardly of said main frame and connected to said power unit, a longitudinally extending bar member pivotally connected to the rear end of said main frame for pivoting around a transverse axis and extending a substantial distance forwardly from said main frame, a caster unit swivelly connected to the forward end of said bar member and being provided with a ground-engaging wheel, and interengaging means carried by said bar member and said main frame formed and arranged to releasably lock said main frame at times in a forwardly tilted position with respect to the axis of said first-mentioned pair of ground-engaging wheels, whereby the implement may be supported in an elevated position, and wherein forward support for the cultivator is provided by said caster unit.

2. In a garden cultivator of the character described, a main frame, a pair of ground-engaging wheels journaled to said main frame, a power unit mounted on said main frame, a handle secured to said main frame and extending upwardly and rearwardly therefrom, a rotary implement located rearwardly of said main frame and connected to said power unit, a longitudinally extending bar member pivotally connected to the rear end of said main frame for pivoting around a transverse axis and extending a substantially distance forwardly from said main frame, a caster unit swivelly connected to the forward end of said bar member and being provided with a ground-engaging wheel, a vertical slotted arcuate bracket secured to the side of said main frame, a pin member carried by said bar member slidably engaged in the slot of said bracket, an upwardly extending spring detent member carried by said bracket and being cammingly engageable by said pin member, said pin member being arranged to lock above the top end of said detent member responsive to forward tilting movement of said main frame around the axis of said first-mentioned ground-engaging wheels, and flexible cable means connected to said detent member and extending to said handle, said flexible cable means being arranged to move said detent member out of locking engagement with said pin member.

3. In a garden cultivator of the character described, a main frame, a pair of ground-engaging wheels journaled to said main frame, a power unit mounted on said main frame, a handle secured to said main frame and extending upwardly and rearwardly therefrom, a rotary implement located rearwardly of said main frame and connected to said power unit, a longitudinally extending bar member pivotally connected to the rear end of said main frame for pivoting around a transverse axis and extending a substantial distance forwardly from said main frame, a caster unit swivelly connected to the forward end of said bar member and being provided with a ground-engaging wheel, interengaging means carried by said bar member and said main frame formed and arranged to releasably lock said main frame at times in a forwardly tilted position with respect to the axis of said first-mentioned pair of ground-engaging wheels, whereby the implement may be supported in an elevated position, and wherein forward support for the cultivator is provided by said caster unit, and a shield member overlying the cultivator blades and hinged to the rear end of said main frame.

4. In a garden cultivator of the character described, a main frame, a pair of ground-engaging wheels journaled to said main frame, a power unit mounted on said main frame, a handle secured to said main frame and extending upwardly and rearwardly therefrom, a rotary implement located rearwardly of said main frame and connected to said power unit, a longitudinally extending bar member pivotally connected to the rear end of said main frame for pivoting around a transverse axis and extending a substantial distance forwardly from said main frame, a caster unit swivelly connected to the forward end of said bar member and being provided with a ground-engaging wheel, interengaging means carried by said bar member and said main frame formed and arranged to releasably lock said main frame at times in a forwardly tilted position with respect to the axis of said first-mentioned pair of ground-engaging wheels, whereby the implement may be supported in an elevated position, and wherein forward support for the cultivator is provided by said caster unit, and a housing carried by said caster unit arranged for receiving ballast.

5. In a garden cultivator of the type having a main frame, a handle secured to said main frame, a pair of ground-engaging wheels journaled to said main frame, and an implement connected to said main frame and located rearwardly thereof, forward support means for the cultivator comprising a longitudinally extending bar member pivotally connected to the rear end of said main frame for pivoting around a transverse axis, and extending a substantial distance forwardly from said main frame, a caster unit pivotally connected to the forward end of said bar member and being provided with a ground-engaging wheel, a vertical slotted arcuate bracket secured to the side of said main frame, a pin member carried by said bar member slidably engaged in the slot of said bracket, an upwardly extending spring detent member carried by said bracket and being cammingly engageable by said pin member, said pin member being arranged to lock above the top end of said detent member responsive to forward tilting movement of said main frame around the axis of said first-mentioned ground-engaging wheels, and flexible cable means connected to said detent member and extending to said handle, said flexible cable means being arranged to move said detent member out of locking engagement with said pin member.

BERTRAM A. HALVERSON.

References Cited in the file of this patent

UNITED STATES PATENTS

| Number | Name | Date |
|---|---|---|
| 309,337 | Cook | Dec. 16, 1884 |
| 2,051,443 | Gravely | Aug. 18, 1936 |
| 2,406,484 | Allen | Aug. 27, 1946 |
| 2,426,529 | Silver | Aug. 26, 1947 |
| 2,428,973 | Kelsey | Oct. 14, 1947 |
| 2,564,201 | Hainke | Aug. 14, 1951 |

FOREIGN PATENTS

| Number | Country | Date |
|---|---|---|
| 226,650 | Switzerland | July 16, 1943 |